United States Patent
Gbadegesin et al.

(10) Patent No.: US 9,916,150 B2
(45) Date of Patent: Mar. 13, 2018

(54) PUBLIC NETWORK DISTRIBUTION OF SOFTWARE UPDATES

(71) Applicant: Microsoft Corporation, Redmond, WA (US)

(72) Inventors: Abolade Gbadegesin, Redmond, WA (US); Mario C. Goertzel, Redmond, WA (US); Kenneth A. Showman, Redmond, WA (US); Joshua W. Dunn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/311,915

(22) Filed: Jun. 23, 2014

(65) Prior Publication Data

US 2014/0373004 A1 Dec. 18, 2014

Related U.S. Application Data

(63) Continuation of application No. 11/493,277, filed on Jul. 26, 2006, now Pat. No. 8,775,572.

(60) Provisional application No. 60/816,567, filed on Jun. 23, 2006.

(51) Int. Cl.
*G06F 9/445* (2006.01)
*H04L 29/08* (2006.01)

(52) U.S. Cl.
CPC .............. *G06F 8/65* (2013.01); *H04L 67/10* (2013.01); *H04L 67/125* (2013.01); *H04L 67/34* (2013.01)

(58) Field of Classification Search
CPC ......... G06F 8/65; H04L 67/10; H04L 67/125; H04L 67/34
See application file for complete search history.

(56) References Cited

U.S. PATENT DOCUMENTS

| 6,079,020 A | 6/2000 | Liu |
| 6,151,643 A | 11/2000 | Cheng et al. |
| 6,192,518 B1 | 2/2001 | Neal |

(Continued)

OTHER PUBLICATIONS

Non-Final Office Action cited in U.S. Appl. No. 11/493,277 dated Dec. 30, 2008, 21 pgs.

(Continued)

*Primary Examiner* — Oleg Korsak
(74) *Attorney, Agent, or Firm* — Cooper Legal Group, LLC

(57) ABSTRACT

Updates for an enterprise's software product are made available to user devices on-line, even when network resources of the enterprise are unavailable. Software update sets and notifications concerning the update sets may be published by an enterprise for consumption by content distribution partners of the enterprise and parties not affiliated with the enterprise. Each abstraction relating to an update, including update notifications and update sets may include a cryptographic signature for later use in authenticating the source of the abstraction. Update notifications also may include information indicative of: available update sets; and network locations at which the update sets can be accessed. Further, an update notification may be configured with a time-to-live (TTL) value indicating a value of time after which the notification expires. TTL values give the enterprise some control over the distribution of update sets by limiting the lifespan of the update notifications corresponding to the update sets.

20 Claims, 4 Drawing Sheets

(56) References Cited

U.S. PATENT DOCUMENTS

| | | | |
|---|---|---|---|
| 6,199,204 | B1 | 3/2001 | Donohue |
| 6,269,456 | B1 | 7/2001 | Hodges et al. |
| 6,282,709 | B1 | 8/2001 | Reha et al. |
| 6,651,249 | B2 | 11/2003 | Waldin et al. |
| 6,654,786 | B1 | 11/2003 | Fox et al. |
| 6,754,706 | B1* | 6/2004 | Swildens ............... H04L 29/06 709/219 |
| 6,795,858 | B1* | 9/2004 | Jain ................... H04L 67/1008 709/226 |
| 6,907,603 | B2 | 6/2005 | Scott |
| 7,694,293 | B2 | 4/2010 | Rao |
| 7,853,609 | B2 | 12/2010 | Dehghan et al. |
| 8,245,216 | B2 | 8/2012 | Felts |
| 8,909,726 | B1* | 12/2014 | Eckert ..................... H04L 61/00 709/207 |
| 2002/0032668 | A1 | 3/2002 | Kohler et al. |
| 2002/0188867 | A1 | 12/2002 | Bushey et al. |
| 2003/0101446 | A1 | 5/2003 | McManus et al. |
| 2003/0212604 | A1 | 7/2003 | Keil et al. |
| 2004/0003389 | A1 | 1/2004 | Reynar et al. |
| 2004/0031028 | A1 | 2/2004 | Hunt et al. |
| 2004/0054764 | A1 | 3/2004 | Aderton et al. |
| 2004/0107417 | A1 | 6/2004 | Chia et al. |
| 2004/0117785 | A1 | 6/2004 | Kindaid et al. |
| 2004/0148229 | A1 | 7/2004 | Maxwell |
| 2004/0187103 | A1 | 9/2004 | Wickham et al. |
| 2005/0132349 | A1* | 6/2005 | Roberts et al. ............... 717/168 |
| 2005/0228798 | A1 | 10/2005 | Shepard et al. |
| 2005/0235282 | A1 | 10/2005 | Anderson |
| 2006/0020938 | A1 | 1/2006 | Elcock et al. |
| 2006/0106806 | A1 | 5/2006 | Sperling et al. |
| 2006/0136898 | A1 | 6/2006 | Bosscha et al. |
| 2007/0173233 | A1 | 7/2007 | Vander Veen et al. |

OTHER PUBLICATIONS

Reply Non-Final Office Action cited in U.S. Appl. No. 11/493,277 dated Mar. 30, 2009, 9 pgs.
Non-Final Office Action cited in U.S. Appl. No. 11/493,277 dated Jul. 15, 2009, 18 pgs.
Reply Non-Final Office Action cited in U.S. Appl. No. 11/493,277 dated Nov. 16, 2009, 14pgs.
Final Office Action cited in U.S. Appl. No. 11/493,277 dated Feb. 19, 2010, 16 pgs.
Reply Final Office Action cited in U.S. Appl. No. 11/493,277 dated May 19, 2010, 10 pgs.
Non-Final Office Action cited in U.S. Appl. No. 11/493,277 dated Sep. 17, 2010, 21 pgs.
Reply Non-Final Office Action cited in U.S. Appl. No. 11/493,277 dated Dec. 16, 2010, 10 pgs.
Final Office Action cited in U.S. Appl. No. 11/493,277 dated Mar. 2, 2011, 23 pgs.
Reply Final Office Action cited in U.S. Appl. No. 11/493,277 dated Jun. 1, 2011, 11 pgs.
Non-Final Office Action cited in U.S. Appl. No. 11/493,277 dated Jun. 20, 2013, 26 pgs.
Reply Non-Final Office Action cited in U.S. Appl. No. 11/493,277 dated Oct. 21, 2013, 16 pgs.
Final Office Action cited in U.S. Appl. No. 11/493,277 dated Nov. 7, 2013, 14 pgs.
Reply Final Office Action cited in U.S. Appl. No. 11/493,277 dated Feb. 7, 2014, 13 pgs.
Notice of Allowance cited in U.S. Appl. No. 11/493,277 dated Feb. 26, 2014, 8 pgs.
Supp. Notice of Allowance cited in U.S. Appl. No. 11/493,277 dated Apr. 24, 2014, 4 pgs.
"Secure Software Distribution System", Tony Bartoletti, Lauri A. Dibbs and Marcey Kelley, Jun. 1997, reprinted from the Internet at: http://csrc.nist.gov/nissc/1997/proceedings/191.pdf, 12 pgs.
"Towards a Unified Formal Model for Supporting Mechanisms of dynamic Component Update", Junrong Shen, Xi Sun, Gang Huang, Wenpin Jiao, Yanchun Sun and Hong Mei, 2005, Proceeding ESEC/FSE-13 Proceedings of the 10th European software engineering conference held jointly with 13th ACM SIGSOFT international symposium on Foundations of software engineering, 11 pgs.
"Automatic Signature filed update in Antivirus software using Active Packets", Akbar, Buhari, Sahaluy and Saleem, 2001, Proceedings of the ACS/IEEE International Conference on Computer Systems and Applications, 4 pgs.
"Patch on Demand" Saves Even More Time?, Angelos D. Keromytis, Aug. 2004, Reprinted from the Internet at: http://www.cs.columbia.edu/~angelos/Papers/r8094.pdf, 3 pgs.
"The Evolution of Software Distribution: Where Did We Come From and Where Are We Heading?", Michael Lazenka, 2005, Published in: Proceeding SIGUCCS '05 Proceedings of the 33rd annual ACM SIGUCCS conference on User services archive, pp. 179-183.
"Deployent of anti-virus software: a case study", Joseph S. Sherif and David P. Gilliam, 1993, Information Management & Computer Security, Currently published as: Information and Computer Security, 6 pgs.

\* cited by examiner

PUBLIC NETWORK DISTRIBUTION OF SOFTWARE UPDATES

CROSS-REFERENCE TO RELATED APPLICATIONS

This application is a continuation of U.S. patent application Ser. No. 11/493,277, titled "PUBLIC NETWORK DISTRIBUTION OF SOFTWARE UPDATES," filed on Jul. 26, 2006, which in turn claims benefit under 35 U.S.C. §119(e) to U.S. Provisional Patent Application No. 60/816,567, titled "PUBLIC NETWORK DISTRIBUTION OF SOFTWARE UPDATES," filed on Jun. 23, 2006. The entirety of both U.S. patent application Ser. No. 11/493,277 and 60/816,567 are hereby incorporated by reference in their entirety as if fully rewritten herein.

BACKGROUND

Some software companies such as, for example, Microsoft Corporation, make software updates available for their products over the Internet. Typically, to obtain these updates, a client (e.g., a PC) periodically requests updates from a company server. The company server determines whether any updates are available and, if so, determines whether the updates are applicable to the client. For example, the company server may determine that a patch is available for a particular platform and version of a software product, and determine whether the client has a matching platform and software version. The company server allows the client to download updates that the server determines to be applicable to the client.

A problem arises when a client cannot access the company servers. The company servers may be inaccessible for any of a variety or reasons, such as bandwidth depletion resulting from widespread Internet flooding or denial of service attacks, or other reasons. If the company servers are inaccessible to a client, the client may not receive a critical update in a timely fashion.

SUMMARY

This Summary provides an illustrative context for aspects of the invention, in a simplified form. It is not intended to be used to determine the scope of the claimed subject matter. Aspects of the invention are described more fully below in the Detailed Description.

Described herein are systems and methods for making updates for an enterprise's software product available to user devices on-line (e.g., over the Internet), even when network resources of the enterprise are unavailable. Further, the enterprise may make the updates available in such a way that allows the enterprise to maintain at least some control over the times at which, and the manner in which, upgrades are downloaded to user devices.

As used herein, enterprises include, but are not limited to: companies; corporations; partnerships; sole proprietorships; other types of business entities; organizations; non-profit organizations; governmental bodies and/or agencies; educational institutions; other types of enterprises; and any suitable combination of the foregoing.

Sets of software updates and notifications concerning the update sets may be published by an enterprise (e.g., Microsoft Corporation) for consumption by content distribution partners of the enterprise and parties not affiliated with the enterprise. An "update" or "software update" may embody or include one or more: patches, upgrades; bug fixes; new features; changes; any other type of modification to a software product or component thereof; or any combination of the foregoing. As used herein, an "update set" is a unit of update that includes one or more updates, and an "update notification" or "notification" is a notification concerning one or more update sets. Further, as will be described below in more detail, an update set may include an update catalog cataloging the contents of the update set. An update catalog may list the updates included in the set, and may provide additional information about the updates, e.g., the product, platform, language, version, etc., corresponding to the update, and may organize the listing of upgrades within the catalog based on these one or more pieces of information.

In some embodiments, the update catalog of an update set and each update itself (which may include other information specific to the update) are maintained as separate software abstractions (e.g., files or objects). The updates, notifications and catalogs may be stored together or separately and/or may be communicated separately or together (e.g., as a package) to network devices.

Each abstraction relating to an update, including update notifications and update sets (or update catalogs and updates themselves if packaged separately) may include a cryptographic signature for later use in authenticating the source of the abstraction. Update notifications also may include information indicative of: available update sets (e.g., update catalog identifiers); and network locations at which the update sets can be accessed (e.g., location identifiers). Further, an update notification may be configured with a time-to-live (TTL) value indicating a value of time after which the notification expires.

An update set may be considered a "snapshot" of at least a portion of a database of updates maintained by an enterprise, for example, for a particular product or product line. In such cases, the database may include all upgrades for a product, a product line, an enterprise, etc., whereas an update set may include only a subset of all upgrades, organized together for a particular reason. For example, a certain update set may be a grouping of updates that collectively provide a fix to a critical problem. Further, the grouping of updates included within an update set may overlap with the grouping of updates included within another update set, and the updates within one update set may be overridden or made obsolete by an update included in a later update set. For these reasons, it may be desirable for an enterprise to control the lifespan of each update set, to prevent update sets from being downloaded to a user device after they become outdated or obsolete. Thus, in some embodiments of the invention, each update notification includes a TTL value that limits the lifespan of the update set.

By strategically organizing updates into update sets, assigning TTL values to update sets and including the TTL values in the notifications corresponding to these sets, enterprises can impose control over the manner and timing of update distribution to user devices. Enterprises may control the frequency with which update sets are published, and thus the frequency with which user devices must consult with the enterprise for updates (directly through its servers or those of its affiliates or indirectly through non-affiliated servers). As will be described in more detail below, enterprises may reap further benefits and exercise further control over user devices when the user devices obtain update notifications, update catalogs and/or updates from network devices affiliated with the enterprise such as, for example, network devices owned and/or operated by the enterprise itself or content distribution partners of the enterprise. Further, the use of TTL values may assist in preventing user devices from downloading outdated or obsolete updates from an unscrupulous third party, who may be publishing such updates to purposely expose user devices to a vulnerability.

Publishing update sets (which each may include an update catalog separate from the update(s)) and update notifications may involve sending them to network devices and/or making them available for download by other network devices. These network devices may include network devices that are not affiliated with the enterprise. As used herein, an entity (e.g., a network device and/or enterprise) is affiliated with an enterprise if the entity is owned by the entity or has an arrangement with the enterprise (e.g., a partnership, joint venture, contract or agreement (oral or written), etc.) with respect to distributing updates for the enterprise.

Network devices, including network devices not affiliated with an enterprise, may make the update sets and update notifications available for consumption by user devices. The notifications may be advertised and/or sent to subscribers, or the subscribers may periodically check appropriate servers for update notifications to determine what updates are available. For example, an Internet Service Provider (ISP) (or other type of service provider and/or network operator) may make the updates, catalogs and notifications available on one or more of the ISP's servers for consumption by its subscribers. The updates, update catalogs and update notifications each may be made available on a same network device or in various combinations on different network devices. For example, a user device my access a notification for an update set on one server, which leads the user device to access the update catalog of the update set on another server, which results in the user device downloading one or more updates of the update set from yet another server.

User devices may be configured (e.g., with an intelligent agent) to access and/or receive update notifications, for example, from a network device affiliated or not affiliated with the enterprise that created the update notification. The user device (or more precisely, the update client on the user device) may authenticate the update notification based on a cryptographic signature therein. If the update notification is authenticated successfully, the update client then may determine whether the update notification has expired based on a TTL value stored in the update notification. If the update notification has not expired, the update client may access the update set at the location specified by the update notification (e.g., a same or different update server from which the update notification was obtained). The update client on the user device then may determine whether any of the updates within the update set apply to the user device, and download any updates that it determines are applicable.

DETAILED DESCRIPTION

Figure 1:
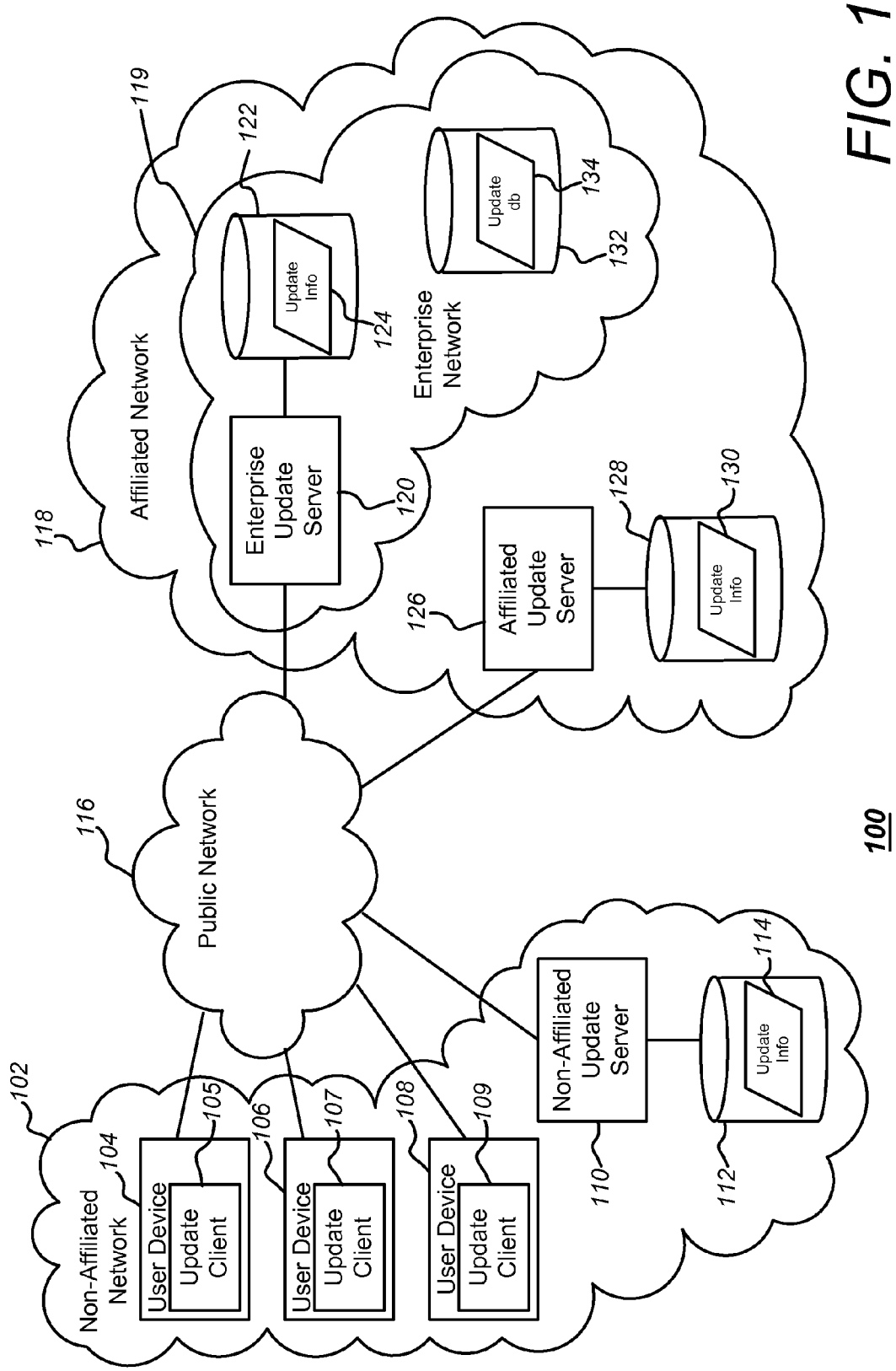
FIG. 1 is a block diagram illustrating an example of a system for distributing software updates on a network, according to some embodiments of the invention.

The function and advantages of embodiments of the present invention described above and other embodiments will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, transceivers, wireless access points (APs), repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline, mobile, smart, IP-enabled, other types of telephones or any suitable combination of the foregoing); pagers; Blackberry™ brand devices, PCS devices, personal digital assistants (PDAs), two-way radios (e.g., "walkie-talkies"), other types of user devices, and any suitable combination of the foregoing.

A network (e.g., any of networks 102, 116 and 118 described below) may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

EXAMPLES

FIG. 1 is a block diagram illustrating an example of a system 100 for distributing software updates on a network, according to some embodiments of the invention. System 100 is merely an illustrative embodiment of a system for distributing software updates, and is not intended to limit the scope of the invention. Any of numerous other implementations of such a system, for example, variations of system 100, are possible and are intended to fall within the scope of the invention.

System 100 may include non-affiliated network 102, public network 116 and affiliated network 118. Affiliated network 118 may include network resources owned or affiliated with an enterprise that produces the software product(s) for which one or more updates are distributed. Network 118 may include one or more enterprise update servers (e.g., 120), one or more affiliated update servers (e.g., 126) and one or more computer-readable storage media 122, 128 and 132.

Update database 134 may be stored on computer-readable medium 132. Update database 134 may include all of the updates available for distribution, for example, all the updates available for distribution for a particular product or product line offered by the enterprise. As noted above, the enterprise may desire to release a particular grouping of updates to its customers, for example, a particular group of updates related to a fix for a critical bug. Accordingly, the enterprise may package this grouping of updates as an update set, which may be considered a sort of "snapshot" of a subset of the update database. The update set may include one or more updates and information specific to these updates, and may include an update catalog cataloging all of the updates included in the update set. The update catalog may list all of the updates and organize the updates according to any of a variety of criteria such as, for example, software product, version, language, country, computer platform, computer hardware, computer environment, etc. This update set then may be internally published within the enterprise, for example, within enterprise network 119, which may be a sub-network of affiliated network 118. That is, the update set may be published only to enterprise update servers such as server 120, and stored internally on computer-readable media (e.g., 122) within the update information 124 stored on the computer-readable medium.

Along with the update set itself, network resources on the enterprise network may create an update notification, which may be used to notify update clients of the availability of an update set for download. An update set and its corresponding update notification may be packaged together as an update package and communicated to other update servers.

Figure 2:
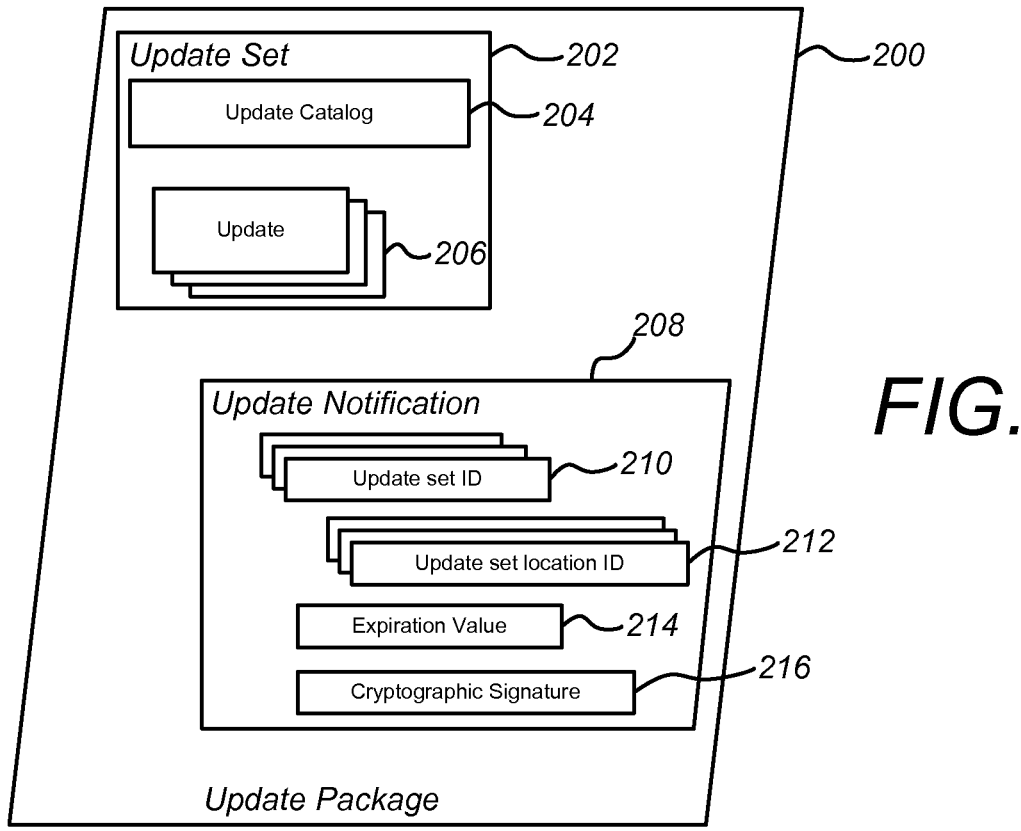
FIG. 2 is a block diagram illustrating an example of an update package, according to some embodiments of the invention.

Digressing briefly from FIG. 1, FIG. 2 is a block diagram illustrating an example of an update package 200, according to some embodiments of the invention. Update package 200 is merely an illustrative embodiment of an update package and is not intended to limit the scope of the invention. Any of numerous other implementations of an update package, for example, variations of package 200, are possible and are intended to fall within the scope of the invention.

Package 200 may include an update set 202 and an update notification 208. As described above, an update set may be further divided into an update catalog 204 and the individual updates 206. For example, the update set 202 may be a single software abstraction or may be divided into multiple software abstractions, one or more of these abstractions representing the update catalog 204 and one or more of these abstractions representing each of the updates 206.

The update notification 208 may include one or more update set IDs 210, one or more update set location IDs 212, expiration value 214 and a cryptographic signature 216. It should be noted that, although not shown in FIG. 2, each of update set 202, update catalog 204 and update(s) 206 may include an cryptographic signature as well. The update notification may include a plurality of update set ID 210 because an update notification may correspond to more than one update set. For example, in addition to update set 202, the update notification may be configured to notify update clients of additional update sets. In some embodiments, the update notification 208 includes a separate cryptographic signature 216 for each update set. For example, for each update set corresponding to the update notification 208, the cryptographic signature 216 itself may serve as the update set ID of the update set.

Each update set location ID 212 may be any of a variety of types of location identifiers, such as, for example, a hyper-text transport protocol (HTTP) uniform resource locator (URL). As will be described in more detail below, an update client may use the update set location ID 212 to determine the network location at which an update set may be accessed.

Each update notification 208 also may include an expiration value 214, (i.e., a time-to-live (TTL) value). The expiration value 214 specifies a period of time after which the update notification 208 will expire, so that update clients do not continue to access update sets that are outdated, obsolete or otherwise no longer valid.

In some embodiments of the invention, for example, when the enterprise is Microsoft Corporation, an update notification 208 may be configured in a compressed format such as, for example, as a cabinet (i.e., CAB) file. Further, because accessing one of these notifications may trigger an update client to access an update set, these notifications may be considered "triggers" and, in some embodiments, "trigger CAB" files.

As noted above, by strategically grouping updates within an update set, assigning expiration values to update notifications and controlling the frequency with which update notifications are published, an enterprise can control the timing and manner in which update clients receive software updates. Further, because the update sets are published beyond the realm of the enterprise network 119, and even the affiliated network 118, the enterprise can still control the update behavior of the update clients to some extent even when the enterprise network 119 and/or the affiliated network 118 is not accessible to update clients. For example, an update client may be permanently (e.g., by configuration of a network) or temporarily (e.g., due to a network failure) unable to access network resources of the enterprise, but still able to access the published updates and update notifications from other network resources.

The update package 200 may be configured to facilitate the deployment of critical updates to networks that do not have access to the affiliated network 118 (i.e., isolated networks). For example, update packages 200 may be configured to be easily deployable on a non-affiliated server (e.g., update server 110), such as an HTTP server. Packages may be configured to enable Internet Service Providers (ISPs) or other types of service providers or network operators to relatively quickly configure and enable alternate sources for detecting and downloading updates, including critical updates.

Returning to FIG. 1, resources on the enterprise network 119 may publish (e.g., proliferate) update information including any of: update packages, update sets, update catalogs, updates and/or update notifications; other update information; or any suitable combination of the foregoing beyond the realm of enterprise network 119 to other resources on the affiliated network 118, such as affiliated update server 126, which may store update information 130 on computer-readable medium 128.

Enterprise and affiliated update servers (e.g., 120 and 126, respectively) may communicate the update information to other update servers (e.g., non-affiliated update server 110) or make the update information available so that other update servers can access the update information. Enterprise, affiliated and non-affiliated update servers may communicate across public network 116. It should be appreciated that networks 102, 116 and 118 may have boundaries that overlap, and these networks may be considered part of a single network.

A non-affiliated network (e.g., network 102) may include one or more user devices (e.g., 104, 106 and 108) on which update clients may reside (e.g., 105, 107 and 109) and one or more non-affiliated update servers (e.g., server 110). Although only a single update server 110 is shown on network 102, it should be appreciated that several servers may be present on the network, and different update servers may serve different functions with respect to providing updates to update clients, as will be described in more detail below.

Each update server (e.g., 110) may have access to update information (e.g., 114) stored on a computer-readable medium (e.g., 112). This update information 114 may include any of the information described above in relation to an update package 200. An update set 202 and its corresponding update notification 208 may be included within the same update information accessible by an update server, and/or a subset of this information may be made available. For example, update notification 208 may be more widely distributed and thus available to more update servers than the update set 202 corresponding to the update notification 208. The update notification 208 may by its nature be a smaller abstraction (e.g., file), in some cases a much smaller abstraction, than the update set 202, as the update catalog 204 and the update themselves 206 may be relatively large in size. Thus, it may be desirable and more cost beneficial to disseminate the update notification 208 more widely than the update set 202.

An update server (e.g., 110, 120 and/or 126) may send update notifications to user devices (e.g., 104, 106 or 109) or may simply make the update notification accessible to a user device, which may be configured to periodically check for notifications.

Figure 3:
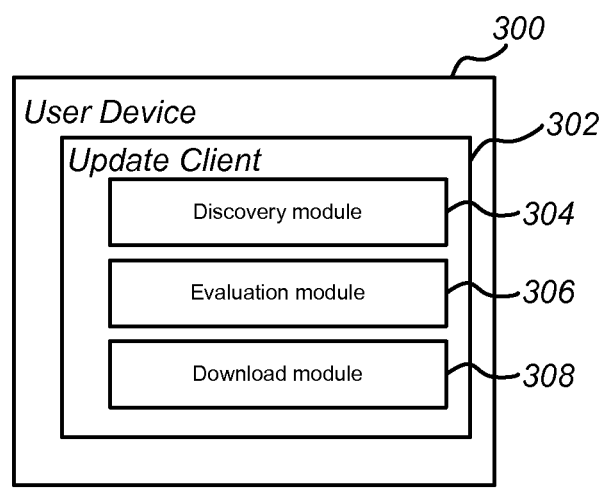
FIG. 3 is a block diagram illustrating an example of an update client in accordance with some embodiments of the invention.

Digressing briefly again from FIG. 1, FIG. 3 is a block diagram illustrating an example of an update client 302 in accordance with some embodiments of the invention. Update client 302 is merely an illustrative embodiment of an update client, and is not intended to limit the scope of the invention. Any of numerous other implementations of an update client, for example, variations of client 302, are possible and are intended to fall within the scope of the invention. In some embodiments of the invention, the update client 302 is or comprises an intelligent agent.

Update client 302, which may reside on a user device 300, may include any of: discovery module 304; evaluation module 306; download module 308; a reporting module (not shown); other modules; or any suitable combination of the foregoing. Discovery module 304 may be configured to discover the availability of any update sets. For example, module 304 may be configured to receive update notifications from an update server and/or to periodically access one or more update servers to determine if there are any new update notifications (i.e., notifications that it has not yet processed).

The discovery module 304 may be configured to access update notification from one or more update servers. For example, module 304 may be configured to use a DNS name that resolves to an IP address of the update server (e.g., 110) at which notification(s) reside. An ISP or other service provider or network operator of network 102 may provide a domain name service (DNS) server configured to map the DNS name provided by the discovery module to the update server. The discovery module 304 may be configured with one or more DNS names that resolve to an IP address within a non-affiliated network (e.g., 102) and one or more DNS names that resolve to an IP address within an affiliated network (e.g., 118). For example, if the user device 300 is isolated from affiliated network 118, then the discovery 304 may be configured with a name that resolves to an IP address of an update server within non-affiliated network 102. This update server may have been specifically provisioned for this purpose by the service provider, network operator or other entity in control of network 102. Accordingly, the update client's ability to obtain update notifications, and consequently updates themselves, may not require accessing any resources on affiliated network 118. Thus, the user device 300 may remain isolated from the affiliated network 118, but still have the ability to obtain updates in a timely manner.

The discovery module 304 also may be configured with a DNS name that resolves to an update server within affiliated network 118. Such an arrangement may be desirable by the enterprise (although the configuration of the user device may not be under its control), so that the enterprise can remain in closer contact with the user device. In this manner, the enterprise (or one of its affiliates) may record and maintain more current information about the update client and may provide additional information and/or services to the update client. For example, the update client 302 may include a reporting module (not shown) that may report various events to update servers within the affiliated network, and more particularly, within enterprise network 119. These events may be collected within the non-affiliated network 102, for example, on one of the update servers 110, and provided to network resources on the affiliated network. If the affiliated network 118 is not accessible during the collection of this information, the information can be reported after access has been re-established.

In some embodiments, a discovery module 304 may be configured with multiple DNS names, and may establish a priority order between the DNS names. For example, the discovery module 304 may be configured to attempt first to use a DNS name that resolves to an IP address of a resource within affiliated network 118. If this resolution fails or the network resource is otherwise available, the discovery module 304 then may use the DNS name that resolves to another network resource, for example, a network resource within non-affiliated network 102. Any number of DNS names may be maintained and used by the discovery module 304 in any of a variety of priority orders. For example, the discovery module 304 may be configured to try three different DNS names that all resolve to the affiliated network before resorting to a DNS name that resolves to a network resource (e.g., update server 110) within non-affiliated network 102. In other embodiments, the discovery module 304 may first try to resolve one or more IP address of a resource within its own non-affiliated network 102 before attempting to use a DNS name that resolves to a resource on the affiliated network 118. A DNS server may be configured to resolve these addresses accordingly.

In some embodiments, the discovery module 304 may be configured to use a DNS name that resolves to an anycast IP address when attempting to access update notifications. And "anycast" IP address is an IP address that may correspond to multiple nodes on a network such as the Internet. When a packet is sent to anycast IP address, routers along its path are responsible for selecting a target node from the candidate nodes. The selection of the node is typically based on which of the candidates is nearest. In embodiments in which an anycast address is used, a service provider or network operator of non-affiliated network 102 may configure a server (e.g., an HTTP server) with the anycast IP address, and configure any routers within the non-affiliated network 102 to forward packets for the anycast IP address to a given an HTTP server on which the update notifications are stored, for example, non-affiliated update server 110.

Evaluation module 306 may be configured to access the update sets at the location specified by the update notification and evaluate the update set to determine whether any of the updates of the set are applicable to user device 300. For example, evaluation module 306 may be configured to analyze the update catalog (e.g., 204) of the update set (e.g., 202) to determine which updates are applicable to user device 300. This may include considering any of the criteria described above with respect to updates to the state of such criteria for the user device 300. For example, if an update is specified for a particular version of an operating system running on a particular processor, the evaluation module 306 may be configured to determine whether the user device 300 uses the particular operating system and the particular processor. If either of these criteria are not met, the evaluation module 306 may be configured to decide not to download the update.

If the evaluation module 306 determines to download an update, then download module 308 may download the update (e.g., update 206) in accordance with information provided within the update 206, such as the file location and download instructions. Accordingly, only updates within the update set that are required by the user device 300 are actually downloaded. Further, this determination is made by logic residing on the user device 300 itself, not using the logic on an update server such as an update server within affiliated network 118. Accordingly, user device 300 is able to determine on its own, without assistance from resources on the enterprise network, whether it needs to download an update.

System 100 and components thereof may be implemented using any of a variety of technologies, including software (e.g., C, C#, C++, Java, J# or a combination thereof), hardware (e.g., one or more application-specific integrated circuits), firmware (e.g., electrically-programmed memory) or any combination thereof. Further, each of the components of system 100 may reside in one or more locations on the system 100. For example, different portions of the components may reside in different areas of memory (e.g., RAM, ROM, disc, etc.) on the system 100. System 100 may include, among other components, a plurality of known components such as one or more processors, a memory system, a disc storage system, one or more network interfaces, and one or more busses or other internal communication links interconnecting the various components. System 100, and components thereof, may be implemented using one ore more computer systems such as the computer system described below in relations to FIGS. 5 and 6.

Figure 4:
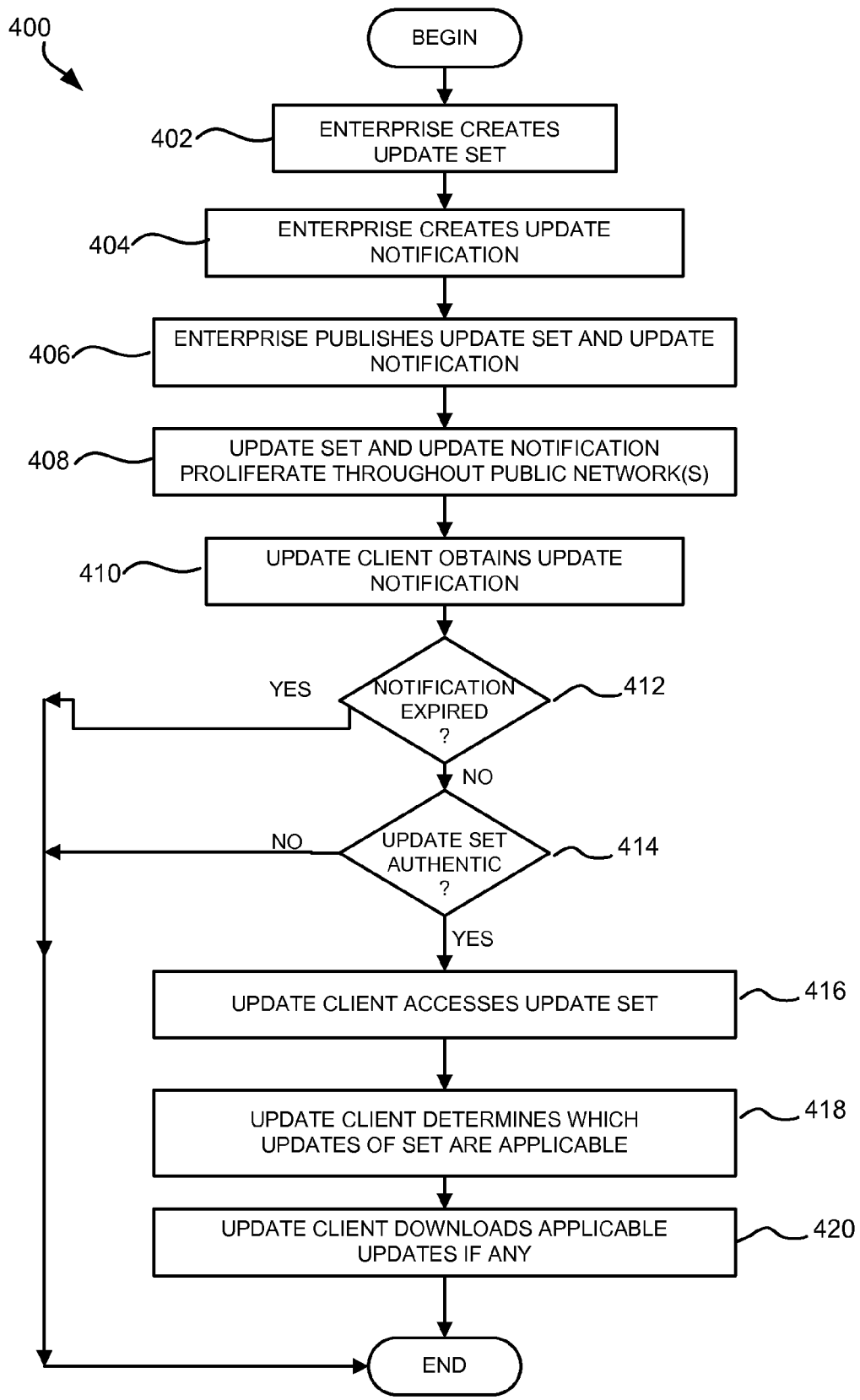
FIG. 4 is a flow chart illustrating an example of a method of distributing software updates on a network, according to some embodiments of the invention.

FIG. 4 is a flow chart illustrating an example of a method 400 of distributing software updates on a network, according to some embodiments of the invention. Method 400 is merely an illustrative embodiment of a method of distributing software updates on a network, and is not intended to limit the scope of the invention. Other implementations, for example, variations of method 400, are possible and intended to fall within the scope of the invention.

In Acts 402 and 404, an enterprise may create an update set and create an update notification corresponding to this set, for example, as described above in relation to FIG. 1.

In Act 406, the enterprise may publish the update set and update notification, for example, on update servers within the enterprise network (e.g., network 119) and/or affiliated network (e.g., network 118) of the enterprise, for example, as described above in relation to FIG. 1. The update set and update notification may be proliferated throughout public networks, such as public network 116, which may result in these updates and update notifications being available on non-affiliated networks, such as network 102. As described above in relation to FIG. 1, this proliferation may result from update sets and update notifications being sent to other update servers and/or other update servers accessing the updates and update notifications from update servers such as those residing within affiliated network 118.

In Act 410, clients may obtain update notifications (e.g., from update servers), for example, as described above in relation to FIGS. 1 and 3, and in particular with respect to discovery module 304 of user device 300. In Act 412, it may be determined whether the notification has expired, for example, by examining an expiration value within the update notification as described above in relation to FIGS. 1 and 3. If the notification has expired, the method 400 may end. Otherwise, it may be determined in Act 414, for each update set specified within the update notification, whether the update set is authentic. For example, discovery module 304 may be configured to decrypt the cryptographic signature of each update set. If the encryption is successful, then it may be deemed that the update set has been positively authenticated, and the method may proceed to Act 416.

In Act 416, an update client may access the update set specified by the update notification, for example, as described above in relation to FIGS. 1 and 3. In Act 418, the update client, in particular, an evaluation module of the update client, may determine which updates of the set are applicable to the user device on which the update client resides. The update client then may download any updates it determines are applicable in Act 420.

Method 400 may include additional acts. Further, the order of the acts performed as part of method 400 is not limited to the order illustrated in FIG. 4, as the acts may be performed in other orders and/or one or more of the acts may be performed in parallel, at least partially.

Method 400 and/or acts thereof, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (including method 400 and/or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 200, 500 and 600 described herein, may be distributed across one or more of such components, and may be in transition there between.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, any of the computer systems described in relation to FIGS. 1, 2, 5 and 6, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

Figure 5:
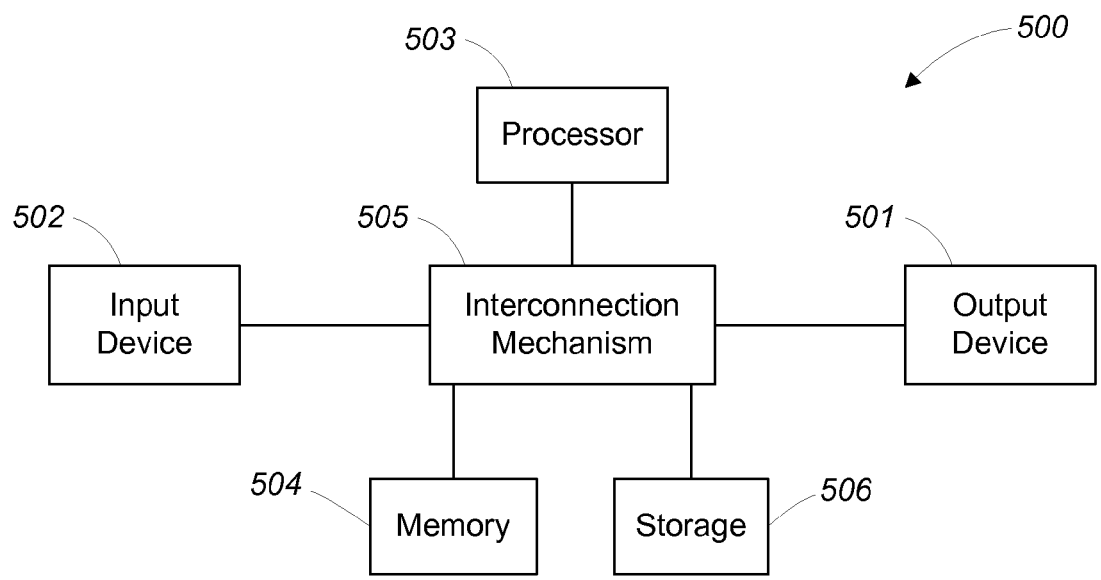
FIG. 5 is a block diagram illustrating an example of a computer system on which some embodiments of the invention may be implemented.

For example, various aspects of the invention may be implemented as specialized software executing in a general-purpose computer system 500 such as that shown in FIG. 5. The computer system 500 may include a processor 503 connected to one or more memory devices 504, such as a disk drive, memory, or other device for storing data. Memory 504 is typically used for storing programs and data during operation of the computer system 500. Components of computer system 500 may be coupled by an interconnection mechanism 505, which may include one or more busses (e.g., between components that are integrated within a same machine) and/or a network (e.g., between components that reside on separate discrete machines). The interconnection mechanism 505 enables communications (e.g., data, instructions) to be exchanged between system components of system 500. Computer system 500 also includes one or more input devices 502, for example, a keyboard, mouse, trackball, microphone, touch screen, and one or more output devices 501, for example, a printing device, display screen, speaker. In addition, computer system 500 may contain one or more interfaces (not shown) that connect computer system 500 to a communication network (in addition or as an alternative to the interconnection mechanism 505).

Figure 6:
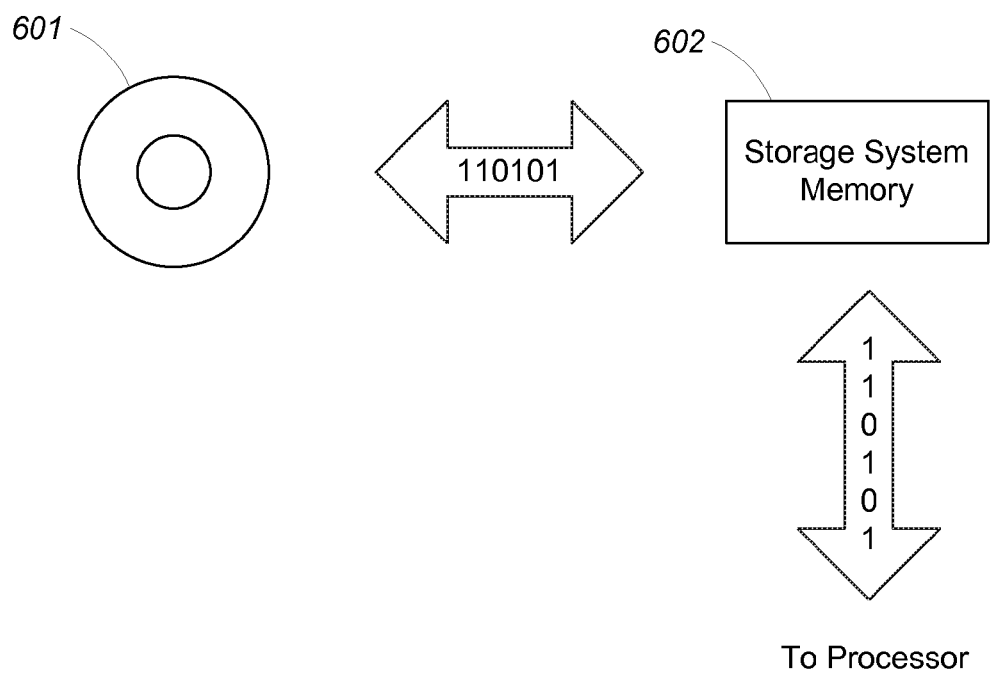
FIG. 6 is a block diagram illustrating an example of a storage system that may be used as part of the computer system to implement some embodiments of the invention.

The storage system 506, shown in greater detail in FIG. 6, typically includes a computer readable and writeable nonvolatile recording medium 601 in which signals are stored that define a program to be executed by the processor or information stored on or in the medium 601 to be processed by the program. The medium may, for example, be a disk or flash memory. Typically, in operation, the processor causes data to be read from the nonvolatile recording medium 601 into another memory 602 that allows for faster access to the information by the processor than does the medium 601. This memory 602 is typically a volatile, random access memory such as a dynamic random access memory (DRAM) or static memory (SRAM). It may be located in storage system 506, as shown, or in memory system 504, not shown. The processor 503 generally manipulates the data within the integrated circuit memory 504, 602 and then copies the data to the medium 601 after processing is completed. A variety of mechanisms are known for managing data movement between the medium 601 and the integrated circuit memory element 504, 602, and the invention is not limited thereto. The invention is not limited to a particular memory system 504 or storage system 506.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 500 is shown by way of example as one type of computer system upon which various aspects of the invention may be practiced, it should be appreciated that aspects of the invention are not limited to being implemented on the computer system shown in FIG. 5. Various aspects of the invention may be practiced on one or more computers having a different architecture or components that that shown in FIG. 5.

Computer system 500 may be a general-purpose computer system that is programmable using a high-level computer programming language. Computer system 500 also may be implemented using specially-programmed, special-purpose hardware. In computer system 500, processor 503 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of disseminating to a plurality of user devices an update set for a software product produced by an enterprise, the method involving a computer having a processor and comprising:

executing, on the processor, instructions that cause the computer to:
(A) transmit the update set to one or more first network devices that are not affiliated with the enterprise; and
(B) transmit, to a plurality of second network devices, an update notification that identifies, as a source of the update set:
a resolvable domain name that is resolvable to a source of the update set specific to a group with which the respective user devices are associated;
an enterprise domain name that resolves to an enterprise server provided by the enterprise, and an enterprise priority identifier indicating a priority of retrieving the update set from the enterprise server;
a non-affiliated domain name that resolves to at least one of the first network devices that are not affiliated with the enterprise, and a non-affiliated priority identifier indicating a priority of retrieving the update set from the non-affiliated server, wherein the non-affiliated priority identifier is different than the enterprise priority identifier.

2. The method of claim 1, wherein the update set is not accessible to the at least one second network device on any network resources of the enterprise.

3. The method of claim 1, wherein the act (A) comprises making the update set available on at least one first network device not affiliated with the enterprise.

4. The method of claim 3, wherein the at least first one network device on which the update set is made available is not configured to access the update set on any network resources of the enterprise.

5. The method of claim 1, wherein the act (B) comprises including, in each of the update notifications, an expiration value indicative of a time at which the update notification expires.

6. The method of claim 1, wherein the software product is produced by Microsoft Corporation and each update notification comprises a Microsoft CAB file, such that the act (B) comprises sending Microsoft CAB files to a plurality of first network devices.

7. The method of claim 1, wherein the act (A) comprises sending an update package to at least one of the one or more first network devices, the update package comprising the update set and one of the update notifications.

8. The method of claim 7, wherein the update set includes a plurality of updates, and wherein the act (A) comprises including an update catalog in the update package, the update catalog cataloging the plurality of updates included in the update set.

9. The method of claim 1, wherein at least one of the one or more first network devices is at least one of the plurality of second network devices.

10. The method of claim 1, wherein at least one of the enterprise domain name and the non-affiliated domain name further resolves to an anycast internet protocol address that specifies at least two candidate nodes that are selectable by a router to fulfill a request by a second network device to retrieve the update set from any of the at least two candidate nodes.

11. A user device associated with a group, the user device comprising:
    a processor; and
    a memory storing instructions that, as a result of being executed on the processor of the user device, cause the user device to apply an update set including one or more updates to a software product produced by an enterprise, by:
    (A) receiving an update notification indicating that an update set is available for download for the software product from:
        an enterprise domain name that resolves to an enterprise server provided by the enterprise; and
        a resolvable domain name that is resolvable to a source of the update set specific to the group with which the user device is associated; and
        at least one non-affiliated domain name that resolves to at least one non-affiliated network devices that arc is not affiliated with the enterprise;
    (B) submit the resolvable domain name to a domain name service of the group, and receive from the domain name server a resolved address of a group server of the group that stores update sets;
    (C) retrieving the update set from the group server at the resolved address;
    (D) only responsive to failing to retrieve the update set from the group server:
        (D1) from the enterprise domain name and the at least one non-affiliated domain name, choosing a lower-priority domain name; and
        (D2) retrieving the update set from the lower-priority domain name; and
    (E) responsive to retrieving the update set, applying the update set to the software product.

12. The device of claim 11, wherein the update set is not accessible to the user device on any network resources of the enterprise.

13. The device of claim 11, wherein the update set is not accessible to the network device on any network resources of the enterprise.

14. The device of claim 11, wherein the at least one of the network devices is a network device not affiliated with the enterprise, such that the act (B) comprises downloading the update set by exchanging communications with a network device not affiliated with the enterprise.

15. The device of claim 11, wherein the update set includes an update catalog cataloging the one or more updates included in the update set, and
    wherein the act (C) comprises the user device comparing information included in the update catalog to information corresponding to the user device.

16. The device of claim 15, wherein the method further comprises:
    (F) if the user device determines that it is necessary to download at least one update included in the update set, downloading the at least one update to the user device.

17. The device of claim 11, the update notification including an expiration value indicative of a time at which the update notification expires, wherein the method further comprises:
    (F) prior to performance of the acts (B) and (C), the user device determining whether the update notification has expired based on the expiration value.

18. The device of claim 11, wherein the update notification includes a cryptographic signature corresponding to the update set, wherein the method further comprises:
    (F) prior to performance of the acts (B) and (C), the user device determining the authenticity of the update set based on the cryptographic signature.

19. A method of updating a software product provided by an enterprise and installed in a memory of a device having a processor and associated with a group, the method comprising:
    executing, on the processor, instructions that cause the device to:
    (A) receive an update notification indicating that an update set is available for download for the software product from:
        an enterprise domain name that resolves to an enterprise server provided by the enterprise, and an enterprise priority identifier indicating a priority of retrieving the update set from the enterprise server; and
        a resolvable domain name that is resolvable to a source of the update set specific to the group with which the device is associated; and
        at least one non-affiliated domain name that resolves to at least one non-affiliated network device that are not affiliated with the enterprise;
    (B) submit the resolvable domain name to a domain name service of the group, and receive from the domain name service a resolved address of a group server of the group that stores update sets;

(C) retrieve the update set from the group server at the resolved address;
(D) only responsive to failing to retrieve the update set from the group server:
   (D1) from the enterprise domain name and the at least one non-affiliated domain name, choose a lower-priority domain name; and
   (D2) retrieve the update set from the lower-priority domain name; and
(E) responsive to retrieving the update set, apply the update set to the software product.

20. The method of claim 19, wherein, executing the instructions further causes the device to, prior to act (C):
   determine an applicability of the update set to the user device; and
   perform act (C) only after verifying the applicability of the update set to the user device.

\* \* \* \* \*